United States Patent
Manes et al.

(10) Patent No.: US 7,345,107 B2
(45) Date of Patent: Mar. 18, 2008

(54) MATERIAL AND METHOD AND DEVICE FOR PRODUCING THE SAME

(76) Inventors: Michael Manes, Am Kirchberg 19, Wachsenburggemeinde (DE) 99310; Michailowitsch Alexander Tarassenko, Dshershinskistrasse 3, Wohnung 9, Stadt Podolsk, Moskauer Gebiet (RU) 142100; Iwanowitsch Alexander Shukow, Watutinstrasse 79, Wohnung 92, Stadt Podolsk, Moskauer Gabiet (RU) 143100

( * ) Notice: Subject to any disclaimer, the term of this patent is extended or adjusted under 35 U.S.C. 154(b) by 493 days.

(21) Appl. No.: 10/312,896
(22) PCT Filed: Jun. 19, 2001
(86) PCT No.: PCT/EP01/06910

§ 371 (c)(1),
(2), (4) Date: Feb. 23, 2004

(87) PCT Pub. No.: WO02/00567

PCT Pub. Date: Jan. 3, 2002

(65) Prior Publication Data

US 2004/0130065 A1    Jul. 8, 2004

(30) Foreign Application Priority Data

Jun. 30, 2000    (RU)    .............................. 2000116996

(51) Int. Cl.
*C08K 3/04*    (2006.01)
(52) U.S. Cl. ..................... 524/493; 523/216; 523/220
(58) Field of Classification Search ................ 524/493; 523/216

See application file for complete search history.

(56) References Cited

U.S. PATENT DOCUMENTS 3,671,624 A    6/1972    Antalek ..................... 264/294

FOREIGN PATENT DOCUMENTS

| | | |
|---|---|---|
| CN | 1162523 | 10/1997 |
| DE | 29518128 U1 | 1/1996 |
| DE | 29805590 U1 | 8/1998 |
| GB | 876271 | 8/1961 |
| JP | 406190385 A * | 7/1994 |
| JP | 8213185 | 8/1996 |
| JP | 410217266 A * | 8/1998 |
| WO | WO 93/08974 A | 5/1993 |
| WO | WO 94/27800 A | 12/1994 |
| WO | WO 96/02373 A | 2/1996 |
| WO | WO 96/17807 A | 6/1996 |

* cited by examiner

*Primary Examiner*—Tae H Yoon
(74) *Attorney, Agent, or Firm*—Meyer & Williams PC; Mark D. Wieczorek, Esq.

(57) ABSTRACT

The invention relates to a material which consists essentially of sand and polymers as well as optionally, a small quantity of aggregates. The invention also relates to a method for producing this material, comprising the following steps: producing a hot molten mixture consisting of sand and polymers; introducing said molten mixture into a mould; cooling the molten mixture under pressure until the molten mixture hardens in the mould. The material can be used e.g. for producing building blocks, pavement slabs, manhole covers, housings in electrical engineering and insulators for high-voltage applications.

14 Claims, 1 Drawing Sheet

MATERIAL AND METHOD AND DEVICE FOR PRODUCING THE SAME

FIELD OF THE INVENTION

The Invention relates in general to a new type of Material that essentially consists of sand and polymers, whereby additional additives may be contained in the material. Also, the Invention relates to a process for the manufacture of this material. Finally, a device is specified by the invention with which the process may be performed to manufacture the material described by the invention.

BACKGROUND OF THE INVENTION

Various attempts are known to create new composite materials, particularly for the purpose of better resource use and of recycling recyclable materials. It is generally known to melt certain plastics (including polymers) into a recycling process and to use them as raw materials for new plastic products.

It is known from GB 876 271 to create a fusion mixture of polyethylene, asphalt, and filler materials for the manufacture of a construction material. Sand is particularly suited for use as a filler material up 50% by weight. The main problem of this known material is its easy flammability and relatively low strength, whereby its realm of application is limited. The manufacturing process is also expensive. Its realm of application is also limited by the fact that it possesses toxic properties because of the materials included.

A material pressed into sheets that contains larger portions of sand and rubber is known from CN 11 622 523. This material mainly serves for the manufacture of casting forms. The manufacture is expensive, and the resulting composite material is relatively unstable, particularly with respect to corrosive substances.

SUMMARY OF THE INVENTION

The task of this invention is to present a material that may be manufactured particularly inexpensively because of its raw materials, that is particularly resistant to other substances, that possesses improved properties, that enables ecological recycling of available raw materials, and that is suited for use in the most varying realms because of its increased flammability resistance.

These and other tasks are solved by the material based on the invention that may be produced via the following process steps:
Creation of a hot fusion mixture of sand and polymers;
Placing the fusion mixture into a mold;
Cooling the fusion mixture under pressure until it hardens in the mold.

Subsequently, further cooling of the material at normal pressure may be performed until crystallization processes are complete.

An essential advantage of the material consists of the fact that, as a main component, sand is available in large amounts and at low cost. Since no great demands are made on the quality of polymers used, waste plastics may be reused for the manufacture of the material. Based on the cooling of the fusion mixture under high pressure, a material results that possesses high strength, and thus that may be subjected to high mechanical loads. The homogenous structure of the material ensures that the polymers surround the sand and any potential additives, so that the emergence of salts or other trace elements is largely prevented, whereby the material retains its advantageous properties over a long period of time, and is greatly resistant to weathering, for example.

Advantageous properties of the material based on the invention in comparison to other materials may be summarized as follows:
Unbreakable and impact-resistant as plastic;
More abrasion-resistant than concrete;
Mechanically treatable, e.g., may be sawn, drilled, or threaded;
As water-proof as glass;
High resistance to chemicals (alkalis, acids, salts);
High electrical resistance;
High thermal resistance;
Good adhesive behavior when combined with concrete;
Subsequent recyclablity using the same treatment process;
Elasticity and color may be adjusted by use of various additives;
High resistance to flammability.

Based on these characteristics, a meaningful realm of application for the material based on the invention exists in the construction world. Stones, sheets, or specially-shaped construction components may be produced from the material, for example.

There also important application fields in the realm of electrical equipment, since the insulation characteristics are comparable to those of ceramic insulators. Therefore, securing systems, insulators, or housings of electrical devices may be made from this material. It may also be used as a carrier material for electrical systems, particularly for photovoltaic elements. The material may also replace metallic materials, such as for the manufacture of energy-intensive products of cast iron or [injection-molded] aluminum. Use of the material for the manufacture of manhole covers or similar is also conceivable.

In accordance with an advantageous embodiment, the step of creation of the hot fusion mixture during the manufacture of the material is divided into the following detail sub-steps:
Heating the sand to a temperature of maximum 800° C.;
Introduction of the heated sand and the polymer into a mixing vat while maintaining the mixing temperature, which is higher than the fusion temperature of the polymer;
Mixing the sand and the polymer to create the hot fusion mixture.

In various embodiment examples, the actual mixing process may be performed in various ways. The hot sand and the polymers may be mixed together in steps so that the desired weight ratio remains essentially constant during the overall mixing process. It is also possible to add the desired amount of polymers to a greater quantity of heated sand, thus ensuring that the polymers reach the desired temperature relatively quickly. It is also possible to add the heated sand to the desired quantity of polymer, whereby the polymer may be in the form of granulate or melted polymers.

One advantageous embodiment of the material distinguishes itself in that it consists of at least 50% sand and 15% polymers (with respect to overall mass). These limits dictate the preferred ratio range of the main materials, sand and polymers. The sand preferably makes up 50% to 85% of the total material mass, while the polymer portion lies between 15% and 50%. These ratios produce especially strong materials that are cheap to produce since the polymer portion may be kept relatively small. It is advantageous if the fusion mixture is cooled in a pressure mold at a pressure of from 1 to 40 kPa and is cooled to a temperature of from 60 to 100°

C. The material receives a homogenous structure because of the increased pressure during the cooling phase, gas bubbles are prevented, and the final strength of the material is increased.

In order to give the material special characteristics, various additives may be added during the phase when the hot fusion mixture is created. For example, it is advantageous to add organic or inorganic fibers in order to form reinforcement that provides the material with increased bending and tensile resistance. Dyes or pigments may be added during mixing, whereby it must be ensured that these dyes are not destroyed by the hot fusion mixture. In order to adapt the temperatures of the fusion mix to such requirements, polymers with lower melting temperatures may be used whereby the additives are added first at a melting mix temperature that is only slightly higher the melting temperature of the polymers.

If the material is to possess high elasticity, chemical softeners or plasticizers may be added. Lubricants are used to simplify the manufacturing process. For certain applications, it may be advantageous if silicates are used as additives.

It is further advantageous if plastic waste is chopped up to produce a granulate polymer to serve as the raw material for the manufacture of the fusion mixture. In this manner, plastic waste available in large quantities may be used, whereby homogenous material properties may be achieved because of the granulation.

The sand to be used for the material preferably possesses a grain size of between 0.5 to 0.9 mm. For other embodiments, the grain size may also vary between 0.005 and 5 mm. To solve the task set for the invention, a process is further described that is defined in Patent claim 9.

The material based on the invention may be used in various realms of technology. In particular, electrical insulation elements may be manufactured from the material. It is advantageous here for the specific resistance of the material based on the invention to be very high. Further, the material is especially suited for the manufacture of floor covering elements such as building blocks, pathway flagstones, and comparable elements. It is particularly advantageous for such applications for the material to be resistant to most chemicals, water, and ultraviolet light.

The invention also specifies a device that is particularly suited to the manufacture of material based on the invention. The essential properties of this device are defined in claim 21. Of particular significance is the presence of a grounding electrode in the sand supply portion of the mixing vat that serves for the electrical discharge of the heated sand. This ensures that electrical charges do not accumulate in the hot fusion mixture that might lead to ignition of the mixture or result in explosive combustion under certain circumstances.

Further advantages, details, and expansions of the invention may be taken from the following description of advantageous embodiments, manufacturing options, and configuration examples.

BRIEF DESCRIPTION OF THE DRAWING

The lone Illustration shows as a flow chart an embodiment of a device that may be used for the manufacture of the material based on the invention.

DETAILED DESCRIPTION

Figure 1:
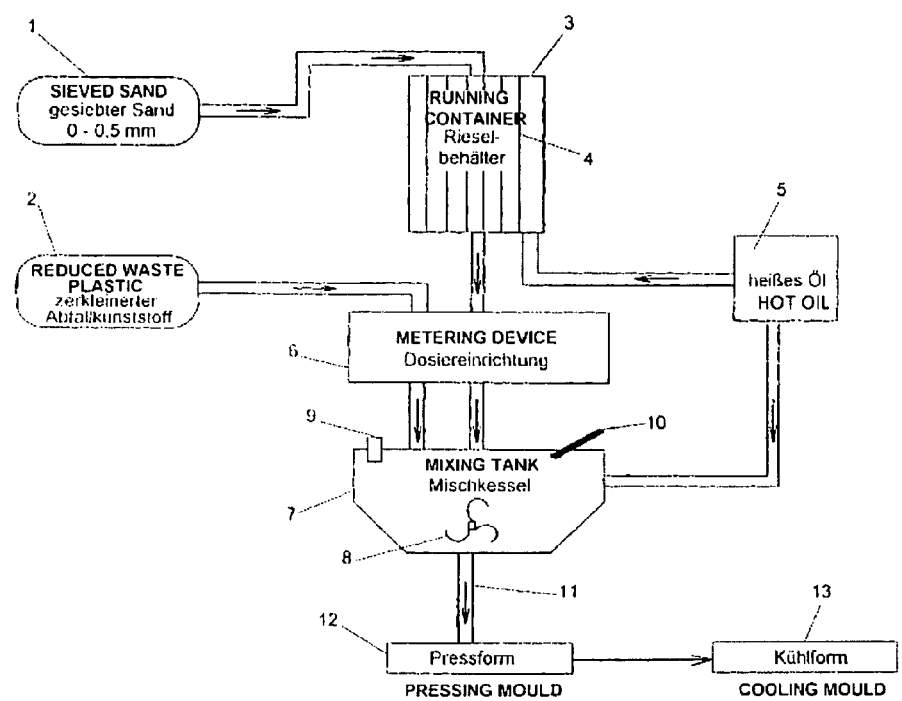

First, an example of a material and the process for its manufacture will be explained. The material possesses the following components: 72% sand, 27.5 polyethylene, and 0.5% dye. In a concrete example, secondary polyethylene is used, i.e., polyethylene retrieved from plastic waste. Red iron ochre is used as dye for this example, which results in a reddish-brown color. In general, other mineral or organic dyes such as carbon monoxide, titanium oxide, or cobalt blue may be used. During manufacture, sand is first heated to about 400° C. Various types of sand may be used, namely natural sand (including quarry sand, river sand, ocean sand, or desert sand) or artificial sand such as, for example, by-products from rock quarries. Specially-manufactured sand of coarse-crystal marble, limestone marble, dolomite, coarse-crystal granite, syenites, clay, roof tile, tuffite, anthracite, clay piping, porcelain, glass, basalt, quartzite, may also be used as raw material, pumice stone, clinkers, perlite, or vermiculite may also be used.

The secondary polymers are added to the heated sand (grain size about 0.5 mm-0.9 mm) under constant mixing. In the concrete example, household waste products such as films, bottles, and other packing materials are used. In general, mixtures of various polymers or pure polymers may be used. It is also possible to use primary or secondary polymers, or mixtures of such polymers. Thermoplastic polymers are usually used, which includes ecologic and economic advantages.

Along with the polymer, the dye is added to the mixture in steps. Mixture of the raw materials is continued until a homogenous plastic mass results, whereby the temperature drops to about 200° C., but not below the melting point of the polymers used. After production of the fusion mixture, the mass is placed into a mold using a conventional process. The mold may possess active or passive heat-exchange cooling devices to cool the mass, but this lengthens the process. During subsequent cooling, pressure of about 29 kPa is maintained until after hardening of the mass, or, in other words, to a temperature below the polymer melting point, which in this example is about 95° C. It must be mentioned that significantly higher pressures may be used if necessary to produce specific properties of the products being manufactured. A processing time of about 150 seconds is achieved with suitable mold cooling.

After production of the material, the following properties may be established from the sample:
Color-reddish brown
Surface: homogenous, flat glossy, non-porous
Density: 2,700 kg/m$^3$
Water absorption: zero
Breaking forces: bending force=150 MPa
  Tensile force=90 MPa
  Pressure force=200 MPa
Acid resistance: 99%
Alkali resistance: 96.5%
Specific electrical resistance: 1×1 ohm×cm The sample piece is hard to burn, and eventually carbonizes in the presence of flame. As soon as the flame is removed, carbonization of the material ceases.

It should be mentioned that, in deviation from the described example, other additives or additional materials may be included in the fusion mixture in order to achieve other material properties.

In order to improve the pressure resistance, proven additives in the form of organic or mineral fibers may be included. Asbestos, glass, acetate, or cotton fibers are well suited to this, for example. Dibutyl and dibutyl phthalate, or triorthocresylphosphate, are suitable as plasticizers to increase material elasticity.

Lubricants such as stearin or wax may be used in order to prevent adherence of the fusion mixture to the mold during compression.

During the manufacture of the fusion mixture, it must particularly be ensured that the heated sand does not lead to an electrostatic charge that might lead to discharges through which the fusion mixture may be ignited. It is worthwhile to provide suitable grounding elements for this in the mixing vat. For example, the heated sand may be passed over a grounded electrode as it is added to the mixing vat so that the individual grains of sand are grounded.

Before the fusion mixture hardens in the mold, various elements and substances may be pressed into the material. For example, the material may form the handle of a screwdriver if the metal shaft of the screwdriver is pressed into the mass. Such a screwdriver would also be suitable for use in electro-technical realms because the high level of electrical resistance of the material. If waste plastic is used, one must ensure that the waste plastic is not contaminated with electrically-conducting materials such as aluminum foil, since the hazard of an electrical connection between the outer surface of the handle and the metal screwdriver shaft might exist.

It is required in any case during manufacture of the material based on the invention to prepare a hot fusion mixture of sand and polymers. This may be performed in various ways. The general options are briefly explained in the following.

According to a first version, a mechanically well-mixed mixture of sand and granulated or chopped polymers and additives as desired is produced at room temperature. This mixture is heated while being constantly stirred more vigorously until a homogenous plastic mass is created. Depending on the polymers used, this will occur between 90 and 500° C.

A second option is to heat the sand alone in advance to a temperature between 200 and 800° C. the required final temperature is again dependent on the polymers used. In a suitable mixing vat, the required amount of polymers, or mixture of polymers and additives, is gradually added to the heated sand while it is constantly stirred. An evolved manufacturing option would be to add the heated sand gradually to the polymer, again while it is constantly stirred. During addition of the main components, the temperature o the mixture drops, whereby it must be ensured that the mixture temperature remains above the meting point of the polymers. The result of this mixing as again a homogenous, plastic mass that is placed into the mold at the desired temperature after subsequent pressure treatment.

A third option would be to add an already-molten polymer or a molten mixture of polymers to the sand which has been heated to a temperature of between 90 and 450° C., again under conditions of constant stirring. Additives are also added. The fusion mixture is stirred until a homogenous, plastic condition is attained.

Manufacture of the material may also be performed in that sand heated to a temperature of between 90 and 450° and additives are added to a molten polymer, whereby a homogenous, plastic condition is attained by constant stirring.

The fifth option to create the hot fusion mixture is to use a secondary mixture that consists of previously fused polymers and sand.

The secondary mixture is chopped and granulated, and stirred and heated until a homogenous, plastic condition is attained, whereby the final temperature is between 90 and 450°, depending on the polymers used. This version is particularly advantageous if the material is to be used in decentralized production facilities for the manufacture of various products, whereby strict process conditions required for the first production of the secondary mixture need not be maintained in these production facilities. There is no hazard of spontaneous ignition during use of the secondary mixture, for example, since no electrostatic charge may accumulate in the sand already bound in polymer.

This manufacturing process may also be used if products made of the material are to be subjected to a recycling process. During recycling of such materials, properties of the material may be altered by adding additional portions of sand, polymers, or additives to the fusion mixture consisting of recycled materials.

The pressure required during the cooling of the fusion mixture in the mold depends on the desired characteristics of the product being manufactured, and on the characteristics of the raw materials used. The pressure used may be between 1 kPa and 40 kPa. The required pressure may be established conventionally by compression, rolling, or similar.

An advantageous embodiment of a device used for the manufacture of the material based on the invention and perform the described process is described in the following by the use of the illustration.

The main raw materials are stored in a sand supply bin 1 or plastic supply bin 2. In the illustrated embodiment example, there is screened sand in the sand supply bin 1 with a grain size of from 0 to 0.5 mm. The screened sand is passed from the sand supply bin 1 to a trickle bin 2[1]. Heat transfer surfaces 4 are located in the trickle bin 3 that are evenly heated by a heat transfer medium 5. In the example shown, hot oil is used as the heat transfer medium provided to the trickle bin 3 and particularly to the heat transfer surfaces 4 located within it. The screened sand flows through the trickle bin 3, preferably by gravity, so that the screened sand slides along the heat transfer surfaces 4 and is thus warmed.

[1] Translator's Note: Should be "3."

The structure of the trickle bin 3 and the trickle speed are so matched to each other that the sand leaves the trickle bin 3 at a temperature of about 300 to 400° C. Heating of the sand within the trickle bin 3 is preferably by means of use of the counter-flow principle, whereby adequate heat supply using heated oil must be ensured. The trickle bin 3 is thermally insulated to prevent heat loss.

Further, a dosing device 6 is included that receives both the heated sand and plastic from the plastic supply bin 2. The device shown works with chopped waste plastic stored in the plastic supply bin 2. In the dosing device, the required amounts of sand and plastic are weighed and passed in the desired ratio to a mixing vat 7 continuously or in steps.

Sand and plastic are mixed together in the mixing vat 7, whereby the temperature of the mixture is maintained to the extent that the plastic is transformed into a liquid aggregate condition. It is thus worthwhile to provide the mixing vat 7 with thermal insulation and to provide the additional heat required via the heat transfer medium 5, e.g., by supplying heated oil to the thermal transfer elements. In order to prevent function breakdowns such as clogged supply lines, plastic and sand are supplied to the mixing vat 7 separately, and are first mixed in it. The mixing vat 7 may include additional supply [lines] (not shown) by means of which other additives (e.g., dyes) may be supplied. Suitable mixing elements 8 such as mixing rollers are positioned within the mixing vat.

In order to compensate for pressure increases, the mixing vat 7 possesses an over-pressure valve 9. It has also been shown that the hazard of electrostatic charge buildup exists during mixing of the heated sand and the plastic. Such electrostatic charges may lead to spontaneous ignition of the fusion mixture, since the plastics and gases arising from them are generally flammable. In case of spontaneous ignition, there exists the hazard of explosion, which would endanger the entire device.

In order to prevent these electrostatic charges, a grounding electrode 10 is provided, by means of which equipotential bonding results and electrical voltages are dissipated. The finished fusion mixture is extracted from the mixing vat at a temperature of about 130° C. (which must be above the melting point of the plastic used). The fusion mixture passes over suitable transporting devices 11 to any type of mold 12, by means of which the resulting products are shaped.

The fusion mixture is poured into the mold 12 below the melting point of the plastic while maintaining the pressure described above. The produced piece may usually be extracted from the mold at a temperature of about 60° C., and may be passed to a cooling mold 13 for further cooling.

A specialist will realize that many versions of the device based on the invention are possible, and that adaptation of the device to the pieces produced must be particularly occur.

Along with the examples named, the material based on the invention may be used in the most varying of application realms because of its many advantageous characteristics.

Large-scale products may also be produced, as may filigree products, if a fusion mixture is used in which fine-grain sand is used.

The invention claimed is:

1. A process to manufacture a material that consists mainly of sand and polymers, comprising:
   creating a hot fusion mixture of sand and polymers;
   placing the fusion mixture into a mold;
   cooling the fusion mixture under pressure of from 1 to 40 kPa until it hardens in the mold; and
   further cooling the hardened material under normal pressure.

2. A process as in claim 1, further comprising cooling the material to about 30° C. after hardening of the fusion mixture under normal pressure.

3. A process as in claim 1, wherein the material comprises about 50% Sand and of at least 15% Polymer with respect to the entire mass.

4. A process as in claim 1, wherein the cooling step further comprises cooling the fusion mixture in the mold at a temperature of about 60° C. to 100° C.

5. A process as In claim 1, wherein the step of creating the hot fusion mixture includes chopping waste plastic to prepare a polymer granulate.

6. A process as in claim 1, wherein the sand possesses a grain size of from 0.5 to 0.9 mm.

7. A process as in claim 1, wherein the step of creating the hot fusion mixture includes the following steps:
   heating the sand to a temperature of from about 90° C. to about a maximum of 800° C.;
   adding the sand and the polymers to a mixing vat while maintaining a mixing temperature that is above the melting temperature of the polymer; and
   mixing the sand and the polymer to create the hot fusion mixture.

8. A process as in claim 7, further comprising adding polymers to the heated sand with constant stirring until the portion of polymer is 15% to 50% of the overall mass of the fusion mixture.

9. A process as in claim 7, further comprising adding heated sand to the polymers with constant stirring until the portion of sand is 50% to 85% of the overall mass of the fusion mixture.

10. A process as in claim 9, further comprising electrically discharging the heated sand before adding the heated sand to the polymers.

11. A process as in claim 7, further comprising heating the polymer to its melting point before it is mixed with the sand.

12. A process as in claim 1, wherein a granulate mixture of sand and polymers is heated to create the hot fusion mixture.

13. A process as in claim 1, further comprising Adding one or more of the following additives to the hot fusion mixture: organic or inorganic fibers; dyes; chemical softeners; plasticizers; lubricants; silicates.

14. A process as in claim 1, further comprising inserting fixed elements into the material during the cooling step under pressure before it hardens in order to secure them into the material by form fit.

* * * * *